United States Patent
Egami et al.

(10) Patent No.: US 11,288,899 B2
(45) Date of Patent: Mar. 29, 2022

(54) DRIVE RECORDER AND SITUATION INFORMATION MANAGEMENT SYSTEM

(71) Applicant: DENSO CORPORATION, Kariya (JP)

(72) Inventors: Kazuki Egami, Kariya (JP); Shinya Kurimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 381 days.

(21) Appl. No.: 16/571,240

(22) Filed: Sep. 16, 2019

(65) Prior Publication Data

US 2020/0098202 A1 Mar. 26, 2020

(30) Foreign Application Priority Data

Sep. 20, 2018 (JP) .............................. JP2018-176224

(51) Int. Cl.
*G07C 5/00* (2006.01)
*H04W 4/02* (2018.01)
*H04W 4/40* (2018.01)
*G07C 5/02* (2006.01)

(52) U.S. Cl.
CPC ............... *G07C 5/008* (2013.01); *G07C 5/02* (2013.01); *H04W 4/027* (2013.01); *H04W 4/40* (2018.02)

(58) Field of Classification Search
CPC ........ G07C 5/008; G07C 5/02; G07C 5/0808; G07C 5/085; H04W 4/027; H04W 4/40; H04W 4/44; H04L 67/12; G08G 1/0112; G08G 1/0133; G08G 1/0137
See application file for complete search history.

(56) References Cited

U.S. PATENT DOCUMENTS

2018/0137698 A1* 5/2018 Yasuda .................. B60R 21/00

FOREIGN PATENT DOCUMENTS

JP 6193912 B2 9/2017

* cited by examiner

*Primary Examiner* — Yuen Wong
(74) *Attorney, Agent, or Firm* — Harness, Dickey & Pierce, P.L.C.

(57) ABSTRACT

A drive recorder is disposed in a vehicle, and includes a situation information transmitter, a character information transmitter, and an updater. The situation information transmitter transmits situation information to a server upon determining that an acceleration of the vehicle is within a transmission determination range that is stored in a storage device, which is indicative that the acceleration of the vehicle is within the transmission detection range. The character information transmitter transmits character information indicative of a character of a driver of the vehicle regarding a drive operation which at least includes the acceleration of the vehicle. The updater (i) receives, from the server, a character reflection range regarding a range of the acceleration of the vehicle being set based on the character information and (ii) updates the transmission determination range stored in the storage device based on the received character reflection range.

7 Claims, 12 Drawing Sheets

FIG. 3

SITUATION INFO STORAGE DATABASE

| DRIVER ID | VEHICLE TYPE | DETECTION DATE/TIME | POS INFO | CAPTURE INFO | ACC (G) |
|---|---|---|---|---|---|
| DRIVER A | VEHICLE TYPE A | 2018/9/01 12:35:45 | ... | ... | ... |
| DRIVER B | VEHICLE TYPE B | 2018/9/10 17:45:10 | ... | ... | |
| DRIVER A | VEHICLE TYPE C | 2018/9/20 08:00:25 | ... | ... | ... |
| . | . | . | . | . | . |

FIG. 4

LEARNING DATABASE

| DRIVER ID | VEHICLE TYPE | RECEPTION DATE/TIME | CHARA INFO (ACC G) |
|---|---|---|---|
| DRIVER A | VEHICLE TYPE A | 2018/9/01 12:35:45 | ... |
| DRIVER B | VEHICLE TYPE B | 2018/9/10 17:45:10 | ... |
| DRIVER A | VEHICLE TYPE C | 2018/9/20 08:00:25 | ... |
| ... | | | ... |

FIG. 5

ACCELERATION RANGE DATABASE

| DRIVER ID | VEHICLE TYPE | ECO-START RNG | ABRPT START RNG | STP ACC RNG | STP BRK RNG | STP DECEL RNG |
|---|---|---|---|---|---|---|
| DRIVER A | VEHICLE TYPE A | ... | ... | ... | ... | ... |
| DRIVER B | VEHICLE TYPE B | ... | ... | ... | ... | ... |
| DRIVER A | VEHICLE TYPE C | ... | ... | ... | ... | ... |
| ... | ... | ... | ... | ... | ... | ... |

US 11,288,899 B2

DRIVE RECORDER AND SITUATION INFORMATION MANAGEMENT SYSTEM

CROSS REFERENCE TO RELATED APPLICATION

The present application is based on and claims the benefit of priority of Japanese Patent Application No. 2018-176224, filed on Sep. 20, 2018, the disclosure of which is incorporated herein by reference.

TECHNICAL FIELD

The present disclosure generally relates to a drive recorder.

BACKGROUND INFORMATION

In the related art, drive recorders can transmit a camera-captured motion picture (i.e., video) to a server that is communicable via a communication network. In one related art embodiment, the drive recorder transmits dangerous driving data (e.g., video data) to the server when detecting that an acceleration of a vehicle, as measured by an acceleration sensor, is within an abnormal range that indicates hard braking (i.e., deceleration) or steep acceleration suggesting accident-prone, dangerous driving behavior. The dangerous driving data may include travel situation data of a vehicle at the time of the dangerous driving behavior, as well as a date and/or time of such behavior. Thereafter, the drive recorder transmits the video (i.e., captured at the registered date/time in the dangerous driving data) to the server in response to (e.g., upon receiving) a video transmission request from the server. Further, the drive recorder immediately transmits the video to the server when the acceleration of the vehicle is within an accident suggesting range that suggests that an accident might be caused.

However, in the related art embodiment, the drive recorder is not capable of appropriately determining the driver's driving characteristics since some drivers brake and/or accelerate harder and/or softer than others.

SUMMARY

It is an object of the present disclosure to appropriately determine the driving habits of respective drivers according to driving characteristics of each of the respective drivers.

BRIEF DESCRIPTION OF THE DRAWINGS

Objects, features, and advantages of the present disclosure will become more apparent from the following detailed description made with reference to the accompanying drawings, in which:

FIG. 3 is a diagram of information stored in a situation information storage database in the server;

FIG. 4 is a diagram of information stored in a learning database in the server;

FIG. 5 is a diagram of information stored in an acceleration range database in the server;

DETAILED DESCRIPTION

Hereinafter, exemplary embodiments of the present invention are described with reference to the drawings.

Figure 1:
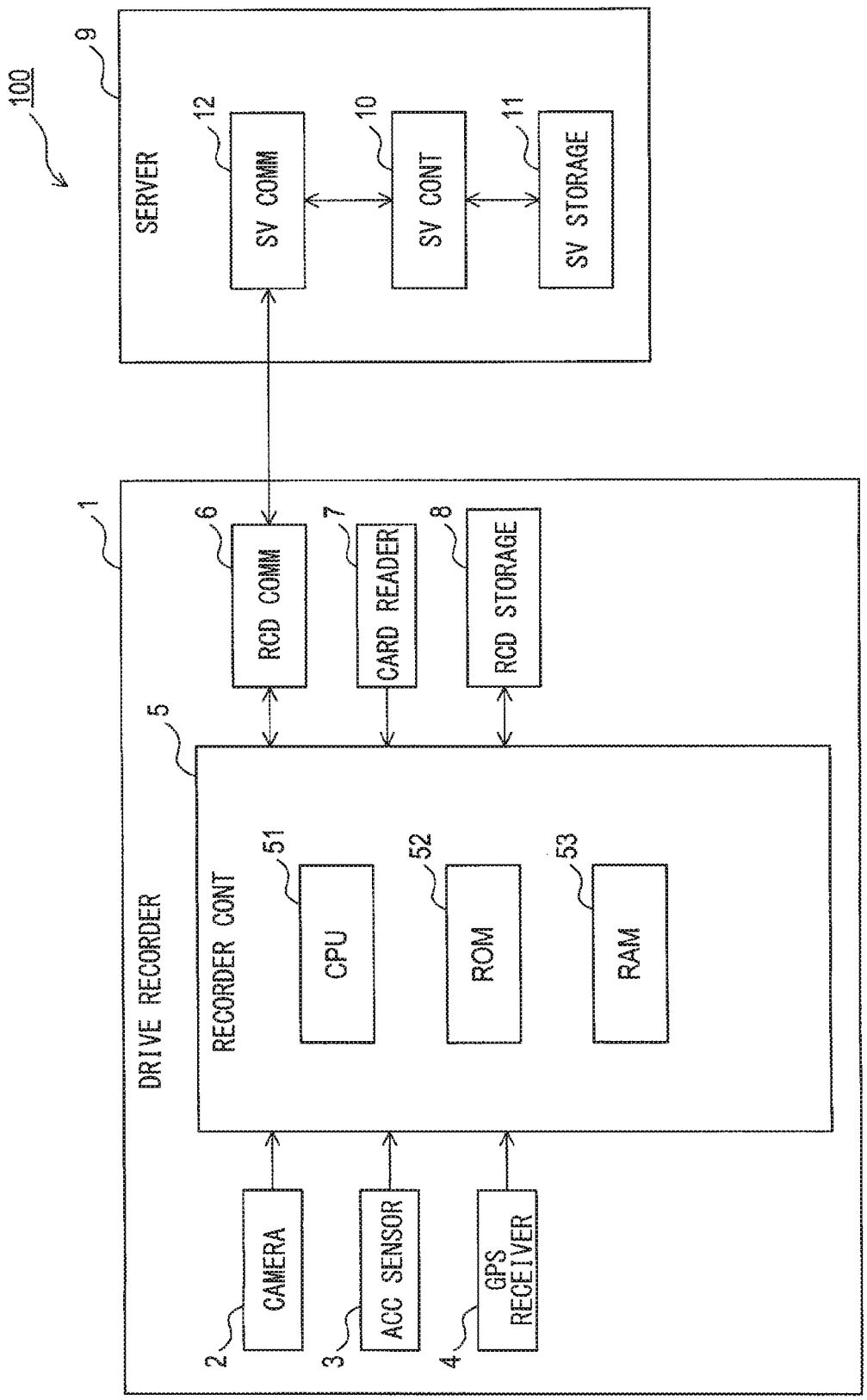
FIG. 1 is a block diagram of a drive recorder and a server.

A situation information management system 100 as shown in FIG. 1 includes a drive recorder 1 installed in a vehicle, and a server 9 capable of wirelessly communicating with a large number of the drive recorders 1, The server 9 also stores and manages various kinds of information transmitted from the respective drive recorders 1.

The drive recorder 1 is installed, for example, on an upper part of a windshield of a vehicle or on a top surface of a dashboard of the vehicle. The drive recorder 1 includes a camera 2, an acceleration sensor 3, a GPS receiver 4, a recorder controller 5, a recorder communication device 6, a card reader 7, and a recorder storage device 8.

The camera 2 is an imaging device for capturing an environment of the vehicle, and, in the present embodiment, a front field of the vehicle. The camera 2 is operable to output at least one of motion pictures, a video image, and a still image to the recorder controller 5 as capture information. In addition to the camera 2, an in-vehicle camera for capturing an interior of the vehicle may be installed.

The acceleration sensor 3 is a sensor that detects acceleration of the vehicle. The acceleration sensor 3 outputs acceleration to the recorder controller 5. The GPS receiver 4 is a receiver that receives positioning signals from GPS satellites. The GPS receiver 4 detects position information which is information representing a current position of the drive recorder 1 based on the received positioning signal. Note that, since the drive recorder 1 is installed in a vehicle, the current position represented by the position information is regarded as the current position of the vehicle. The GPS receiver 4 outputs position information to the recorder controller 5.

The recorder controller 5 is configured primarily as a well-known microcontroller having a CPU 51, a ROM 52, a RAM 53 and the like. The recorder controller 5 may also be configured as a microprocessor, connecting to and including Memory and I/O devices externally (not shown). Hereinafter, the term microcontroller will be used. The CPU 51 executes a computer program stored in a non-transitory, substantive storage medium, i.e., in the ROM 52. By executing such a program, a method corresponding to the program is performed by the CPU 51. Note that the recorder controller 5 may have one microcontroller or multiple microcontrollers. Further, the technique for realizing each of the functions of the respective sections included in the recorder controller 5 is not limited to a software method. That is, the function, in part or as a whole, may also be realized by a hardware method, i.e., by one or more hardware devices. For example, an electronic circuit, which realizes the function as hardware, may be provided as a digital circuit, an analog circuit or a digital-analog hybrid circuit.

The recorder communication device 6 is a communication device for wirelessly communicating with the server 9. The card reader 7 is a device for reading information stored in a card. In the present embodiment, when the driver holds a drivers license (e.g., an IC card) over the card reader 7, information including driver identity information stored in a non-contact type IC chip is read. The card reader 7 outputs this information to the recorder controller 5.

The recorder storage device 8 is a device for storing various information. The recorder storage device 8 stores identity information of the drive recorder 1.

The server 9 is a device capable of collectively managing various information transmitted from a plurality of drive recorders 1. The server 9 includes a server controller 10, a server storage device 11, and a server communication device 12.

The server controller 10 is configured primarily as a well-known microcontroller having a CPU, a ROM, a RAM and the like (not shown). The CPU executes a computer program stored in the ROM that is a non-transitory, substantive storage medium. By executing the computer program, the CPU performs a method corresponding to such a program.

The server storage device 11 is a device for storing various information. The server communication device 12 is a communication device for wirelessly communicating with the drive recorder 1.

Next, an outline of the process implemented by the situation information management system 100 is described.

In the situation information management system 100, when the drive recorder 1 detects acceleration and/or deceleration applied to the vehicle due to a driver's specific actions, for example, a deceleration caused by hard braking, information indicating a situation at the time of detecting the deceleration is transmitted as the situation information from the drive recorder 1 to the server 9. In the situation information management system 100, the server 9 stores the situation information received from the drive recorder 1 in the server storage device 11, and can manage the situation information.

More specifically, the drive recorder 1 may constantly detect at least one of acceleration and deceleration of the vehicle, and transmit the situation information to the server 9 when the detected acceleration and/or deceleration is within the transmission determination range stored in the recorder storage device 8. That is, the transmission determination range is a range of vehicle-applied acceleration and/or deceleration which is set for determination of whether to transmit the situation information to the server 9.

Figure 2:
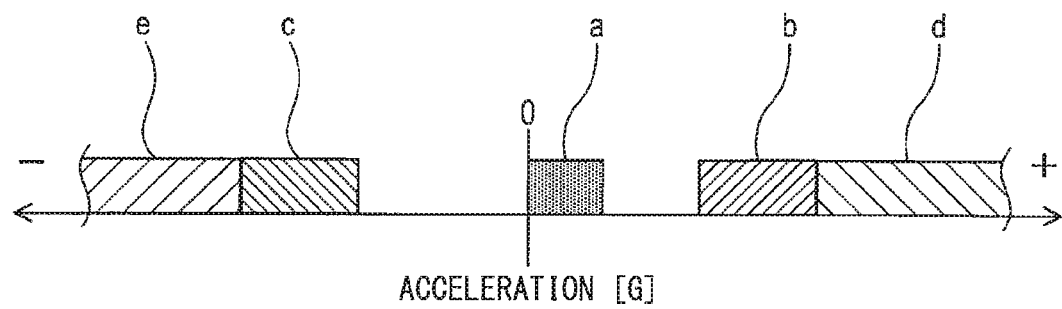
FIG. 2 is a diagram of five transmission determination ranges of acceleration of a vehicle.

In the present embodiment, as shown in FIG. 2, five ranges, i.e., (i) an eco-start range a, (ii) an abrupt start range b, (iii) a steep brake range c, (iv) a steep acceleration range d, and (v) a steep deceleration range e, are set respectively as the transmission determination range. Of course, the invention is not limited to only these five ranges, and could include other ranges that would be understood by one of ordinary skill in the art. The eco-start range a is a range of acceleration that is determined by the starting of a vehicle in a nature-friendly and economical, fuel consumption manner. The abrupt start range b is a range of acceleration that is determinable as starting of a vehicle with an abrupt accelerator pedal operation, or a "rocket start" of a vehicle, in other words. The steep brake range c is a range of acceleration (i.e., deceleration) that is determinable as braking of a vehicle for causing a steep deceleration. The steep acceleration range d is a range of acceleration that is determinable as greater than the abrupt start range b, or an accident-prone (i.e., an accident might be caused) acceleration range of a vehicle. The steep deceleration range e is a range of acceleration (i.e., deceleration) that is determinable as greater than the steep brake range c, or an accident-prone (i.e., an accident might be caused) deceleration range of a vehicle.

In the present embodiment, when the applicable acceleration and/or deceleration applied to the vehicle is within the eco-start range a, within the abrupt start range b or within the steep brake range c, the acceleration, the date and time of detection of such an acceleration and/or deceleration, and the position information of the vehicle when the acceleration and/or deceleration is detected are transmitted as the situation information. Further, in the present embodiment, when the applicable acceleration and/or deceleration applied to the vehicle is within the steep acceleration range d or within the steep deceleration range e, the capture information such as a captured image at such a moment is transmitted as the situation information, in addition to the acceleration, the detection date and time, and the position information. The drive recorder 1 transmits the driver identity information and the identity information of the drive recorder 1 to the server 9 in addition to the situation information.

The server 9 stores the situation information received from the drive recorder 1 in a situation information storage database, which is stored in the server storage device 11 as shown in FIG. 3, after associating the received situation information with the driver identity information and the vehicle type. In the present embodiment, the vehicle type in which the drive recorder 1 is installed is registered in advance to the server storage device 11. Further, in the present embodiment, the vehicle type is registered in association with the identity information of the drive recorder 1. Therefore, in the server 9, the vehicle type is identified from the identity information of the drive recorder 1. That is, in the present embodiment, the identity information of the drive recorder 1 stored in the server 9, serving as "specifiable information," enables the identification of the vehicle type of the installed vehicle.

In particular, the situation information management system 100 of the present embodiment customizes the transmission determination range according to a character of the drivers drive operation. In order to realize such a customization, the situation information management system 100 transmits information representing the character of the drive operation from the drive recorder 1 to the server 9. Then, in the server 9, the character about the drive operation is learned for each driver.

More specifically, the drive recorder 1 periodically transmits, to the server 9, character information which is information representing the characteristics of the drive operation of a driver of the vehicle. In the present embodiment, the acceleration applied to the vehicle is transmitted to the server 9 as the character information. As the character information, in addition to the acceleration, a detection date and time when the relevant acceleration is detected, position information regarding a position of the vehicle when the relevant acceleration is detected and a speed of the vehicle when the relevant acceleration is detected, and the like may also be transmitted. The drive recorder 1 transmits, in addition to the character information, the driver identity information and the identity information of the drive recorder 1 to the server 9.

The server 9 associates the received character information with the driver identity information and the vehicle type, and stores it in a learning database as shown in FIG. 4. In the present embodiment, the learning database stores the character information for each reception date and time. In the server 9, from among the information stored in the learning database, the character information having the same driver identity information and the vehicle type is used to set the character reflection range of the relevant driver. That is, for example, based on the character information having (a) the driver identity information of a driver A and (b) the vehicle type of a pick-up truck, a character reflection range for a combination of the driver A and the pick-up truck is set. The character reflection range is a range corresponding to the transmission determination range, and is a range of acceleration and/or deceleration being customized based on the latest character information. The character reflection range may also be set as five ranges, corresponding to (i) the eco-start range a, (ii) the abrupt start range b, (iii) the steep brake range c, (iv) the steep acceleration range d, and (v) the steep deceleration range e regarding the transmission determination range.

The server 9 associates the character reflection range (i.e., set in the above-described manner) with the driver identity information and the vehicle type, and stores the character reflection range in the acceleration range database (see FIG. 5) that is stored in the server storage device 11. The server 9 overwrites the character reflection range when the character reflection range having the same driver identity information and vehicle type is already stored in the acceleration range database. Thus, in the server 9, as the character reflection ranges are set based on the character information, the character reflection ranges respectively associated with the combinations of (i) the driver identity information of the plurality of drivers and (ii) the plurality of vehicle types are stored in the acceleration range database.

Figure 6:
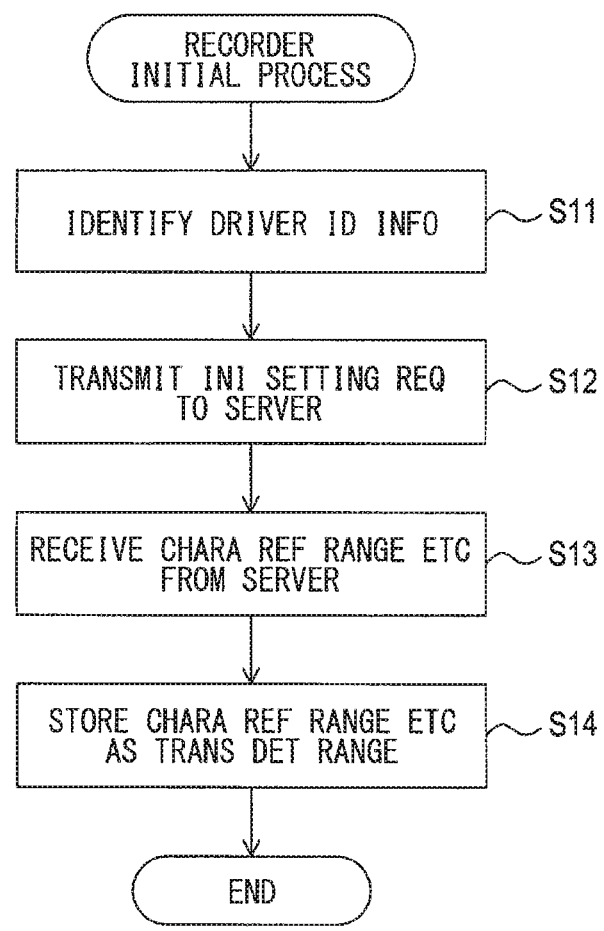
FIG. 6 is a flowchart of a recorder initial process performed in the drive recorder.

Next, a recorder initial process performed by the recorder controller 5 in accordance with the program stored in the ROM 52 is described with reference to the flowchart of FIG. 6. The recorder initial process is performed when a turn ON operation of an ignition switch of the vehicle is performed.

First, at S11, the recorder controller 5 identifies the driver identity information based on the information input from the card reader 7. Note that the recorder controller 5 may prompt, i.e., provide a notice to a driver to, for example, show a driver's license.

Subsequently, at S12, the recorder controller 5 transmits an initial setting request for requesting the character reflection range to the server 9. The initial setting request includes the driver identity information and the identity information of the drive recorder 1.

Subsequently, at S13, the recorder controller 5 receives, from the server 9, one of the character reflection range corresponding to the initial setting request, an estimated determination range (described later), and a default range (described later).

Subsequently, at S14, the recorder controller 5 stores one of the character reflection range, the estimated determination range (described later), and the default range (described later) as the transmission determination range in the recorder storage device 8, and then the recorder initial process of FIG. 6 ends.

Figure 7:
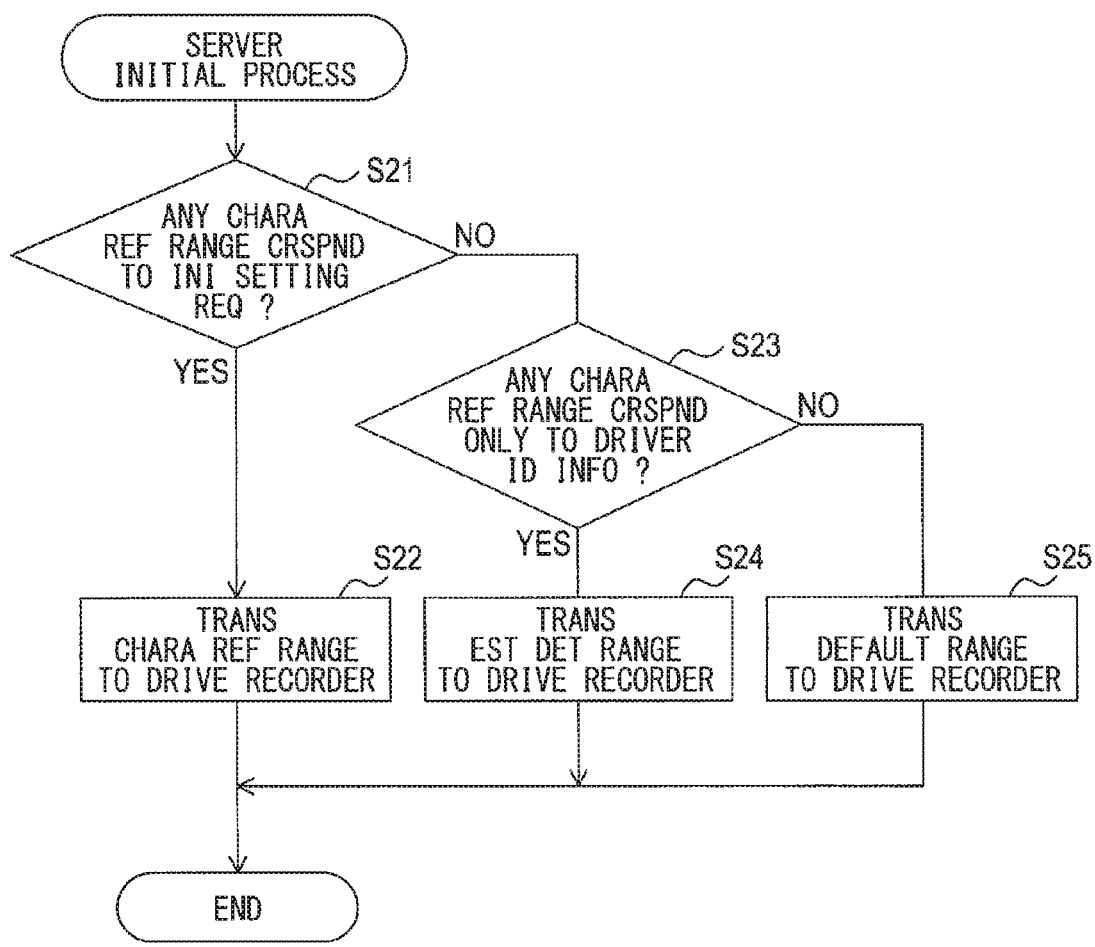
FIG. 7 is a flowchart of a server initial process performed in the server.

Next, a server initial process performed by the server controller 10 in accordance with the program stored in the ROM is described by using the flowchart of FIG. 7. The server initial process is performed upon receiving the initial setting request from the drive recorder 1.

At S21, the server controller 10 determines whether or not the character reflection range corresponding to the initial setting request is stored in the acceleration range database. More specifically, the server controller 10 searches the acceleration range database, for determining whether a character reflection range for a combination of the driver identity information and the vehicle type that are specified in the initial setting request is stored.

If the server controller 10 determines that the character reflection range corresponding to the initial setting request is stored at S21, the process proceeds to S22. After transmitting the character reflection range corresponding to the initial setting request to the drive recorder 1 at S22, the server controller 10 ends the server initial process of FIG. 7.

On the other hand, if the server controller 10 determines that the character reflection range corresponding to the initial setting request is not stored at S21, the process proceeds to S23. At S23, the server controller 10 determines whether or not the character reflection range corresponding only to the driver identity information in the initial setting request is stored in the acceleration range database. More specifically, the server controller 10 searches the acceleration range database to determine whether or not the character reflection range for a combination of the driver identity information and the vehicle type is stored, among which only the driver identity information matches with the request while the vehicle type does not match.

When the server controller 10 determines that the character reflection range corresponding only to the driver identity information in the initial setting request is stored at S23, the process proceeds to S24. At S24, the server controller 10 transmits, to the drive recorder 1, an estimated determination range estimated from the character reflection range corresponding only to the driver identity information in the initial setting request. More specifically, the estimated determination range is estimated from the character reflection range for the combination of the driver identity information and the vehicle type among which the driver identity information matches with the initial setting request, but the vehicle type does not match. For example, when the driver identity information specified in the initial setting request is the driver B and the vehicle type specified in the initial setting request is the vehicle type A, the server controller 10, in view of the acceleration range database in FIG. 5, estimates the estimated determination range (i) based on the character reflection range that is associated with a combination of the driver B and the vehicle type B and (ii) in consideration of the characteristics of the vehicle type A, and transmits the estimated determination range to the drive recorder 1. That is, the characteristics of the acceleration applied to the vehicle are under influence of the vehicle type. For example, while the acceleration tends to increase on average in sports car type vehicle models, the acceleration tends to decrease on average in large vehicles such as trucks. Therefore, it is possible to calculate an estimated value of the character reflection range according to different vehicle types by storing in advance the tendency of acceleration according to the vehicle types. The estimated determination range may be set as five ranges, corresponding to (i) the eco-start range a, (ii) the abrupt start range b, (iii) the steep brake range c, (iv) the steep acceleration range d, and (v) the steep deceleration range e regarding the transmission determination range. Thereafter, the server initial process of FIG. 7 ends.

On the other hand, when the server controller 10 determines that the character reflection range corresponding only to the driver identity information in the initial setting request is not stored at S23, the process proceeds to S25.

At S25, the server controller 10 transmits, to the drive recorder 1, a default range, which is an initial value of the transmission determination range, stored in the server storage device 11. In the present embodiment, the default range is set for each vehicle type based on the tendency of acceleration according to the vehicle type, and is registered to the server storage device 11 in advance. The default range may be set as five ranges, corresponding to (i) the eco-start range a, (ii) the abrupt start range b, (iii) the steep brake range c, (iv) the steep acceleration range d, and (v) the steep deceleration range e regarding the transmission determination range. Thereafter, the server initial process of FIG. 7 ends.

Figure 8:
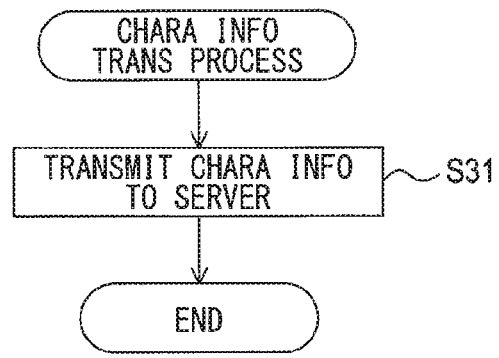
FIG. 8 is a flowchart of a character information transmission process performed in the drive recorder.

Next, the character information transmission process performed by the recorder controller 5 in accordance with the program stored in the ROM 52 is described by using the flowchart of FIG. 8. The character information transmission process is periodically performed while the ignition switch is ON. The character information transmission process may be performed, for example, at the timing when the vehicle stops.

At S31, the recorder controller 5 transmits the character information to the server 9. In the present embodiment, a chronological change of acceleration is transmitted as the character information, Note that the recorder controller 5 transmits the driver identity information and the identity information of the drive recorder 1 to the server 9 in addition to the character information. Further, while the ignition switch is ON, the recorder controller 5 constantly acquires the character information. Thereafter, the character information transmission process of FIG. 8 ends.

Figure 9:
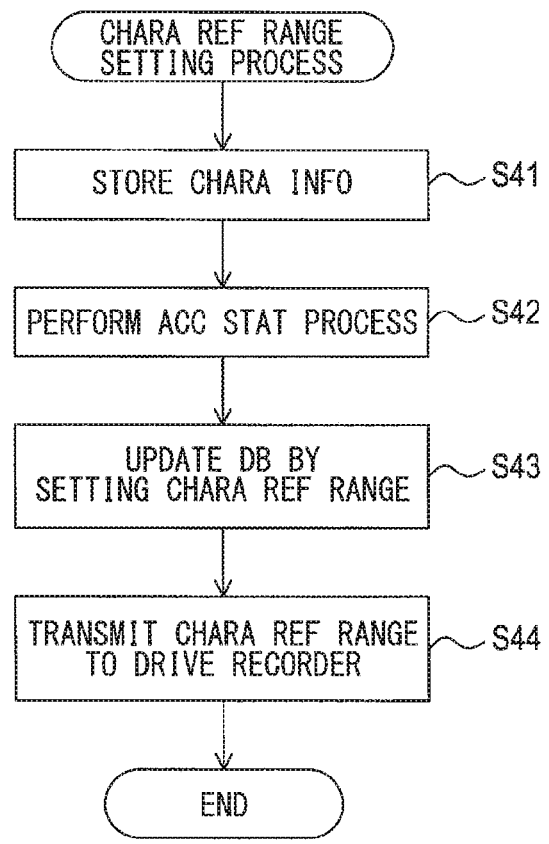
FIG. 9 is a flowchart of a character reflection range setting process performed in the server.

Next, a character reflection range setting process performed by the server controller 10 in accordance with the program stored in the ROM is described by using the flowchart of FIG. 9. The character reflection range setting process is performed upon receiving the character information from the drive recorder 1.

First, at S41, the server controller 10 stores the character information in the learning database sorted by reception date/time, while associating the character information with the driver identity information and the vehicle type, which are specifiable from the driver identity information and the identity information of the drive recorder 1 received from the drive recorder 1 together with the character information. The server controller 10 may delete the character information with the older reception date/time from the learning database, for storing the character information of the latest period only, e.g., of the last two months.

Subsequently, at S42, the server controller 10 performs a statistical process on accelerations of the same driver identity information and the same vehicle type among the character information stored in the learning database. More specifically, for example, an average value and a peak value of accelerations are calculated, and characteristics of the driver's drive operation are determined from the calculation results. For example, when the average of the absolute values of acceleration is lower than a predetermined reference value, it is understood that the driver has a characteristic of weakly pressing the brake pedal and the accelerator pedal. On the other hand, for example, when the average of the absolute values of the acceleration is higher than the reference value, it is understood that the driver has a characteristic of strongly pressing the brake pedal and the accelerator pedal.

Subsequently, at S43, the server controller 10 sets a character reflection range based on the results of the statistical process of acceleration, More specifically, for example, a difference between the average of the absolute values of acceleration and the reference value described above is calculated. Then, in a case where the average of the absolute values of acceleration is lower than the reference value, a lower limit value of the character reflection range is set to be lower in proportion to the difference therebetween. In a case where a driver has the characteristic of pressing the brake pedal and accelerator pedal weakly, it is likely that the absolute value of acceleration in the steep acceleration/deceleration of such driver is on average lower than the absolute value of acceleration of the average driver. On the other hand, when the average of the absolute values of acceleration is higher than the reference value, the lower limit value of the character reflection range is set to be higher in proportion to the difference between the average of the absolute values of acceleration and the reference value. In a case where a driver has the characteristic of pressing the brake pedal and acceleration pedal strongly, it is likely that the absolute value of acceleration in the steep acceleration/deceleration of such driver is on average higher than the absolute value of the average driver. After that, when the character reflection range having the same driver identity information and vehicle type is already stored in the acceleration range database, the server controller 10 overwrites the character reflection range and updates the acceleration range database. Further, the server controller 10 newly adds a character reflection range when the character reflection range having the same driver identity information and vehicle type is not stored in the acceleration range database. Note that the character reflection range may be set upon satisfaction of a condition that the character information of the same driver identity information and vehicle type has been stored by a certain amount or more.

Figure 10A:
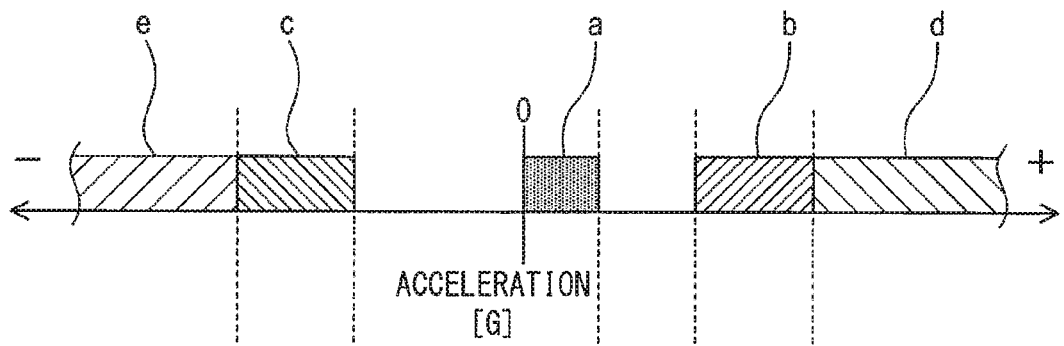
FIGS. 10A/B/C are diagrams of five character reflection ranges of acceleration of the vehicle based on character information.
Figure 10B:
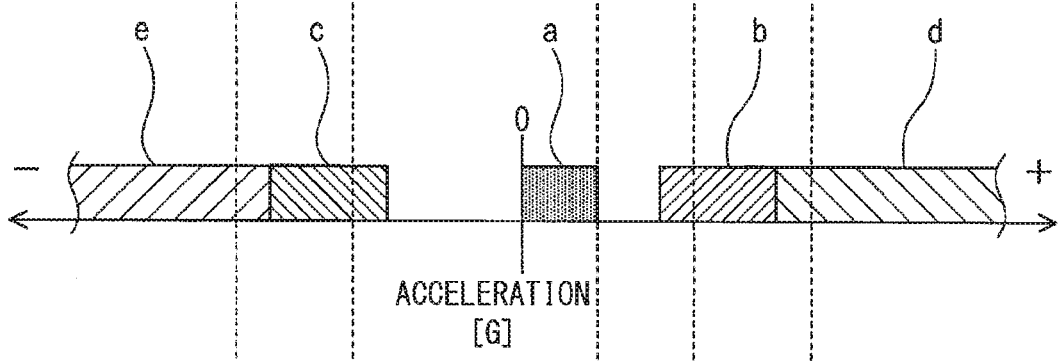
Figure 10C:
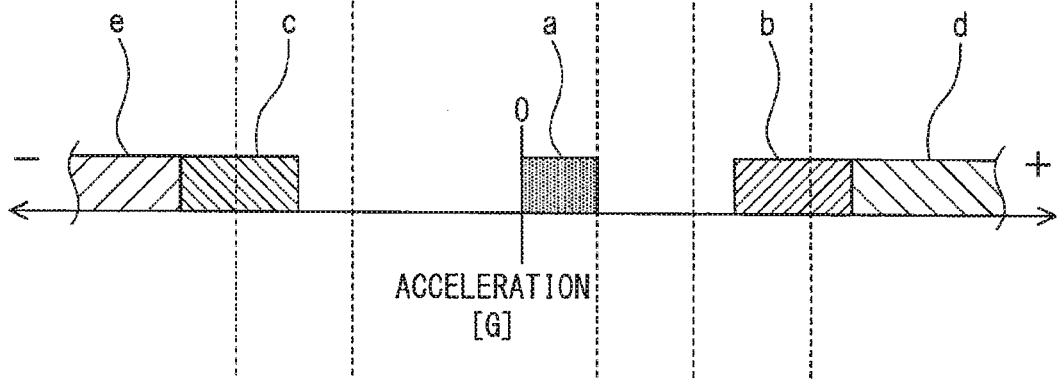

In the present embodiment, as shown in FIGS. 10A-10C, the character reflection range is set according to the characteristic of the driver's drive operation which is grasped based on the result of the statistical process of the acceleration. FIG. 10A is a default range. FIG. 10B is an example of a character reflection range being set for a driver having a characteristic of pressing the brake pedal and the accelerator pedal weakly, in other words, a driver having a low average value of absolute values of acceleration. FIG. 10C is an example of a character reflection range being set for a driver having a characteristic of pressing the brake pedal and the accelerator pedal strongly, in other words, a driver having a high average value of absolute values of acceleration. More specifically, as shown in FIG. 10B, in a case where a driver has a characteristic of pressing the brake pedal and the accelerator pedal weakly, an absolute value of each of the lower limit values of the abrupt start range b, the steep brake range c, the steep acceleration range d, and the steep deceleration range e is set to be lower than that of the default range. Further, as shown in FIG. 100, in a case where a driver has a characteristic of pressing the brake pedal and the accelerator pedal strongly, an absolute value of each of the lower limit values of the abrupt start range b, the steep brake range c, the steep acceleration range d and the steep deceleration range e is set to be higher than that of the default range.

Subsequently, at S44, the server controller 10 transmits the set character reflection range to the drive recorder 1, and then ends the character reflection range setting process of FIG. 9.

Figure 11:
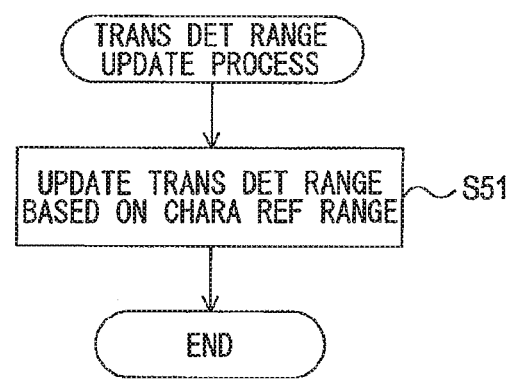
FIG. 11 is a flowchart of a transmission determination range update process performed in the drive recorder.

Next, a transmission determination range update process performed by the recorder controller 5 in accordance with the program stored in the ROM 52 is described by using the flowchart of FIG. 11. The transmission determination range update process is performed upon receiving the character reflection range from the server 9.

At S51, the recorder controller 5 updates the transmission determination range stored in the recorder storage device 8 based on the received character reflection range.

Figure 12:
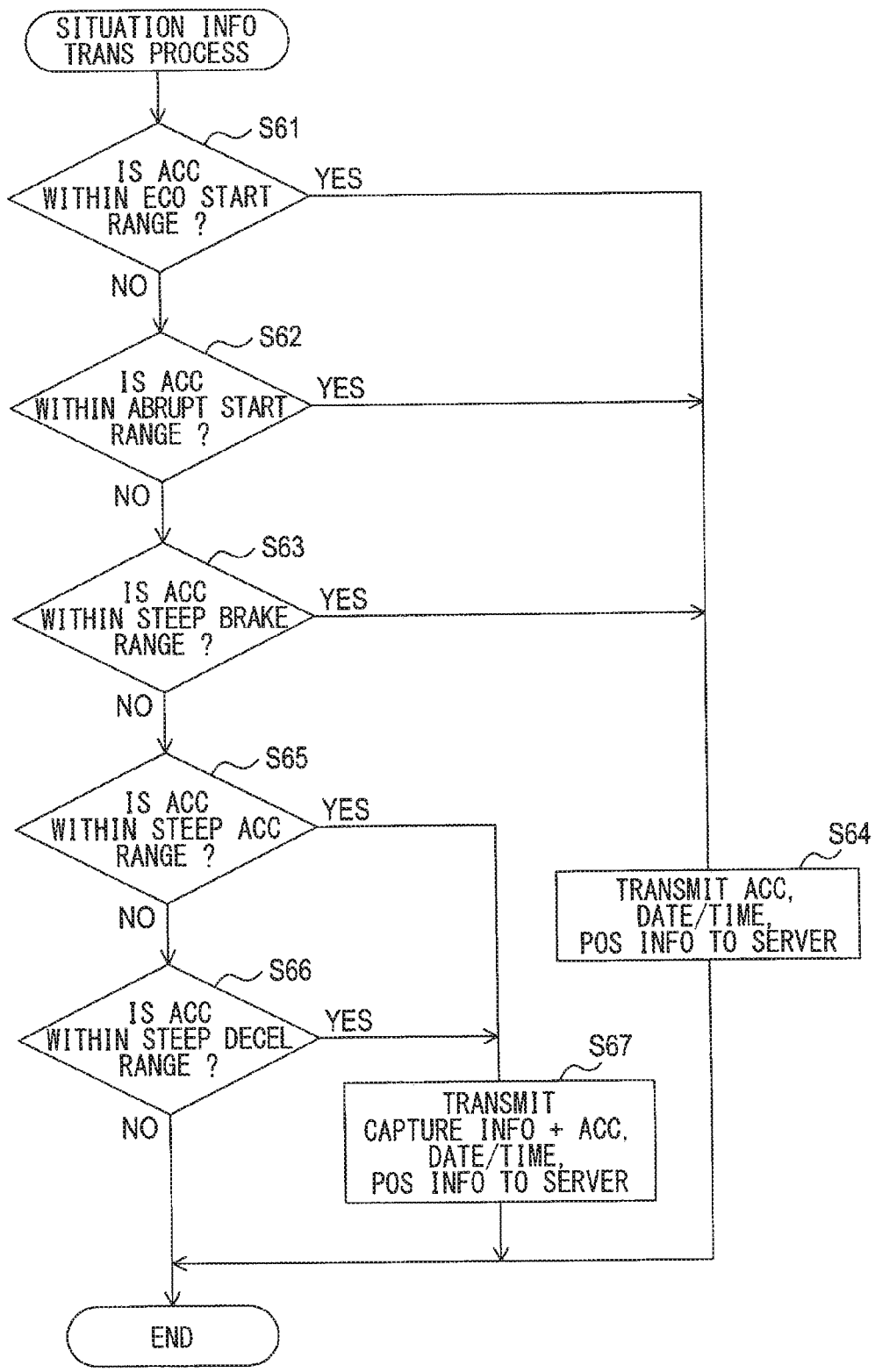
FIG. 12 is a flowchart of a situation information transmission process performed in the drive recorder.

Next, a situation information transmission process performed by the recorder controller 5 in accordance with the program stored in the ROM 52 is described by using the flowchart of FIG. 12. The situation information transmission process is periodically performed while the ignition switch is ON.

First, at S61, the recorder controller 5 determines whether or not the acceleration applied to the vehicle is within the eco-start range a stored in the recorder storage device 8. When the recorder controller 5 determines at S61 that the acceleration applied to the vehicle is not within the eco-start range a, the process proceeds to S62.

At S62, the recorder controller 5 determines whether or not the acceleration applied to the vehicle is within the abrupt start range b stored in the recorder storage device 8. When the recorder controller 5 determines at S63 that the acceleration applied to the vehicle is not within the abrupt start range b, the process proceeds to S63.

At S63, the recorder controller 5 determines whether the acceleration applied to the vehicle is within the steep brake range c stored in the recorder storage device 8. When the recorder controller 5 determines that the acceleration applied to the vehicle is within the steep brake range c at S63, the process proceeds to S64.

On the other hand, when the recorder controller 5 determines at S61 that the acceleration applied to the vehicle is within the eco-start range a, the process also proceeds to S64.

In addition, when the recorder controller 5 determines that the acceleration applied to the vehicle is within the abrupt start range b at S62, the process also proceeds to S64.

At S64, the recorder controller 5 transmits acceleration, detection date and time, and position information to the server 9 as the situation information at the time of detection of the acceleration. The recorder controller 5 further transmits the driver identity information and the identity information of the drive recorder 1 to the server 9 in addition to the situation information. Thereafter, the situation information transmission process of FIG. 12 ends.

On the other hand, when the recorder controller 5 determines at S63 that the acceleration applied to the vehicle is not within the steep brake range c, the process proceeds to S65. At S65, the recorder controller 5 determines whether or not the acceleration applied to the vehicle is within the steep acceleration range d stored in the recorder storage device 8. When the recorder controller 5 determines at S65 that the acceleration applied to the vehicle is not within the steep acceleration range d, the process proceeds to S66.

At S66, the recorder controller 5 determines whether or not the acceleration applied to the vehicle is within the steep deceleration range e stored in the recorder storage device 8. When the recorder controller 5 determines that the acceleration applied to the vehicle is within the steep deceleration range e at S66, the process proceeds to S67.

On the other hand, when the recorder controller 5 determines that the acceleration applied to the vehicle is within the steep acceleration range d at S65, the process also proceeds to S67.

At S67, the recorder controller 5 transmits the capture information to the server 9 in addition to the acceleration, the detection date and time, and the position information as the situation information at the time of detection of the acceleration. The recorder controller 5 further transmits the driver identity information and the identity information of the drive recorder 1 to the server 9 in addition to the situation information, Thereafter, the situation information transmission process of FIG. 12 ends.

On the other hand, when the recorder controller 5 determines at S66 that the acceleration applied to the vehicle is not within the steep deceleration range e, the recorder controller 5 ends the situation information transmission process of FIG. 12.

Figure 13:
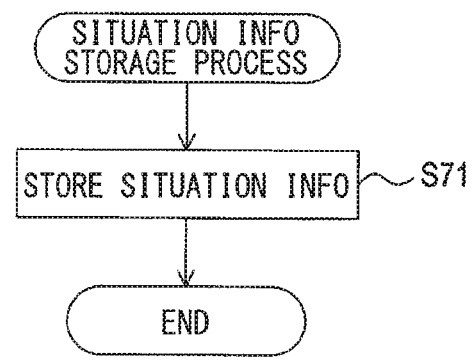
FIG. 13 is a flowchart of a situation information storage process performed in the server.

Next, a situation information storage process performed by the server controller 10 in accordance with the program stored in the ROM is described by using the flowchart of FIG. 13, The situation information storage process is performed upon receiving the situation information from the drive recorder 1.

At S71, the server controller 10 stores the situation information in the situation information storage database in a sorted manner by reception date/time from the drive recorder 1, while associating the situation information with the driver identity information and the vehicle type, which are specifiable from the driver identity information and the identity information of the drive recorder 1 received from the drive recorder 1 together with the character information.

According to the exemplary embodiment described herein, the following effects are achievable.

In the present embodiment, the transmission determination range is updated based on the character information. That is, the drive operation is determined based on the transmission determination range updated according to the character of the driver's drive operation. Therefore, the drive operation is appropriately determinable according to the character of the driver's drive operation.

More specifically, as shown in FIGS. 10A/B/C, for example, the character reflection range may be set for appropriately determining the drive operation of various drivers, i.e., either the driver having the characteristic of pressing the brake pedal and the accelerator pedal weakly (FIG. 10B), or the driver having the characteristic of pressing the brake pedal and the accelerator pedal strongly (FIG. 10C). Therefore, in comparison to the conventional configuration in which the drive operation of the driver is uniform, i.e., without consideration of the driver's character of driving operation, determined based on the predetermined range, the drive operation is more appropriately determinable.

In the present embodiment, the character reflection range may be set for each combination of the driver identity information and the vehicle type. Therefore, the transmission determination range is updated according not only to the characteristics of the driver but also to the characteristics of the vehicle type. Therefore, for example, even in situations that the same driver drives different vehicles, the drive operation of the driver is appropriately determinable.

In the present embodiment, when the character reflection range corresponding to a certain combination of the driver identity information and the vehicle type is not already set (i.e., not found in the database), the transmission determination range may be set according to the vehicle type (S25 in FIG. 7). Therefore, compared with the case where the transmission determination range is set without considering the vehicle type, the drive operation is more appropriately determinable.

The recorder storage device 8 corresponds to a storage device. Further, S11 corresponds to the process as an identifier, S31 corresponds to the process as a character information transmitter, S51 corresponds to the process as an updater, S44 corresponds to the process as a range transmitter, and S62, S64, S66, S68, and S70 correspond to the process as a situation information transmitter.

As mentioned above, although an exemplary embodiment of the invention is described herein, it cannot be overemphasized that the invention can take various forms, without being limited to the exemplary embodiment.

(5a) In the present embodiment, the vehicle type of the vehicle in which the drive recorder 1 is installed is registered in advance in the server storage device 11 by direct input. However, for example, the vehicle type may be transmitted from the drive recorder 1 to the server 9. The vehicle type transmitted to the server 9 may be input to the drive recorder 1. The vehicle type transmitted to the server 9 may also be acquired by communication between the drive recorder 1 and the vehicle.

The driver identity information is not limited to information specific to each driver, but may also include information specific to a group consisting of a plurality of drivers, i.e., for example, information indicating that a driver is a user of a company car that has several users where the car or fleet of cars is managed by a particular company.

In the present embodiment, the drive recorder 1 may further include a gyro sensor to detect vertical and horizontal accelerations applied to the vehicle in addition to the longitudinal (i.e., a front-rear direction) acceleration applied to the vehicle.

The situation information transmitted when the acceleration applied to the vehicle is within the eco-start range a, within the abrupt start range b, within the steep brake range c, within the steep acceleration ranged or within the steep deceleration range e may respectively be customized within a certain range.

The function possessed by one component in the above embodiment may be performed by a plurality of components, or the function possessed by a plurality of components may be integrated into and performed by one component. A part of the configuration of the above embodiment may also be omitted. At least a part of the configuration of the above embodiment may be added to, or replaced with another configuration of the above embodiment, or the like.

In addition to the drive recorder 1 described above, the present invention may also be realizable as a control device that controls the drive recorder 1, a program for causing a computer to function as such a control device, a medium storing such a program, and a transmission determination range update method and so on, in various forms.

What is claimed is:

1. A drive recorder disposed in a vehicle comprising a recorder controller, wherein the recorder controller is configured to:
   transmit situation information to a server upon determining that at least one of an acceleration and deceleration of the vehicle is within a transmission determination range that is stored in a storage device, the situation information indicative of a situation at a time of detecting that the at least one of the acceleration and deceleration of the vehicle is within the transmission determination range,
   transmit character information indicative of a character of a driver of the vehicle regarding a drive operation which at least includes the at least one of acceleration and deceleration of the vehicle,
   receive, from the server, a character reflection range regarding a range of the at least one of acceleration and deceleration of the vehicle being set based on the character information which is calculated based on a difference between an average of absolute values of the at least one of acceleration and deceleration of the vehicle and a reference value, and
   update the transmission determination range stored in the storage device based on the received character reflection range.

2. The drive recorder of claim 1, wherein the recorder controller is configured to identify driver identity information, and transmit the driver identity information of the driver together with the character information to the server.

3. The drive recorder of claim 1, wherein the recorder controller is configured to transmit, together with the character information, specifiable information that enables the server to specify a vehicle type.

4. A situation information management system comprising:
   a drive recorder disposed in a vehicle; and
   a server configured to communicate with the drive recorder,
   wherein the drive recorder includes a recorder controller, wherein the recorder controller is configured to:
   transmit situation information to a server upon determining that at least one of an acceleration and deceleration of the vehicle is within a transmission determination range that is stored in a storage device, the situation information indicative of a situation at a time of detecting that the at least one of the acceleration and deceleration of the vehicle is within the transmission determination range,
   transmit character information indicative of a character of a driver of the vehicle regarding a drive operation that at feast includes the at least one of acceleration and deceleration of the vehicle,
   receive, from the server, a character reflection range regarding a range of the at least one of acceleration and deceleration of the vehicle being set based on the character information which is calculated based on a difference between an average of absolute values of the at least one of acceleration and deceleration of the vehicle and a reference value, and
   update the transmission determination range stored in the storage device based on the received character reflection range, and
   wherein the server is configured to set the character reflection range based on the character information received from the drive recorder and transmit the character reflection range to the drive recorder.

5. A method of determining driving habits of respective drivers, comprising:
   determining that at least one of an acceleration and deceleration of a vehicle is within a transmission determination range that is stored in a storage device;
   transmitting situation information to a server, the situation information indicative of a situation at a time of detecting that the at least one of the acceleration and deceleration of the vehicle is within the transmission determination range;
   transmitting character information indicative of a character of a driver of the vehicle regarding a drive operation which at least includes the at least one of the acceleration and deceleration of the vehicle;
   receiving from the server, a character reflection range regarding a range of the at least one of acceleration and deceleration of the vehicle being set based on the character information which is calculated based on a difference between an average of absolute values of the at least one of acceleration and deceleration of the vehicle and a reference value; and updating the transmission determination range stored in the storage device based on the received character reflection range.

6. The method of determining driving habits of respective drivers according to claim 5, further comprising:
identifying information of the driver as driver identity information; and
transmitting the driver identity information of the driver together with the character information to the server.

7. The method of determining driving habits of respective drivers according to claim 5, further comprising:
transmitting, together with the character information, specifiable information that enables an identification of a vehicle type.

* * * * *